(12) United States Patent
Ohashi et al.

(10) Patent No.: US 8,245,826 B2
(45) Date of Patent: Aug. 21, 2012

(54) POWER TRANSMITTING APPARATUS

(75) Inventors: Tatsuyuki Ohashi, Shizuoka (JP); Shouji Asatsuke, Shizuoka (JP); Akio Oishi, Shizuoka (JP); Ryouhei Chiba, Shizuoka (JP); Jun Ishimura, Shizuoka (JP); Keiichi Ishikawa, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 13/076,219

(22) Filed: Mar. 30, 2011

(65) Prior Publication Data

US 2011/0233019 A1    Sep. 29, 2011

Related U.S. Application Data

(63) Continuation of application No. PCT/JP2009/003208, filed on Jul. 9, 2009.

(30) Foreign Application Priority Data

Sep. 30, 2008    (JP) .................................. 2008-253076

(51) Int. Cl.
*F16D 25/10* (2006.01)
*F16H 45/00* (2006.01)
(52) U.S. Cl. .... 192/3.22; 192/3.26; 192/3.3; 192/48.61; 192/48.617
(58) Field of Classification Search ................. 192/3.22, 192/3.26, 48.61, 48.616, 48.617
See application file for complete search history.

(56) References Cited

U.S. PATENT DOCUMENTS

| | | | |
|---|---|---|---|
| 3,442,155 A | 5/1969 | Clark | |
| 3,463,033 A * | 8/1969 | Fisher | 192/3.26 |
| 4,036,081 A | 7/1977 | Onuma et al. | |
| 5,888,161 A * | 3/1999 | McCarrick et al. | 475/43 |
| 2008/0156608 A1* | 7/2008 | Kombowski | 192/48.1 |

FOREIGN PATENT DOCUMENTS

JP    2005-003193    1/2005

* cited by examiner

*Primary Examiner* — Rodney Bonck
(74) *Attorney, Agent, or Firm* — Knobbe, Martens, Olson & Bear LLP

(57) ABSTRACT

A power transmitting apparatus for transmitting power from a driving source of a vehicle to its wheels can be adapted to properly select transmitting or cutting-off of the driving force of the driving source to or from the wheels. The apparatus can comprise a torque converter having a torque amplifying function; a clutch mechanism including a first clutch device operable on advancement of the vehicle and adapted to transmit the driving force of the driving source to the wheels through a power transmitting system of the torque converter and a second clutch device adapted to transmit the driving force of the driving source to the wheels without the power transmitting system of the torque converter. A selecting device can be configured to operate the first clutch device and/or the second clutch device in accordance with operation modes of the vehicle, including starting.

16 Claims, 10 Drawing Sheets

[Fig 1]
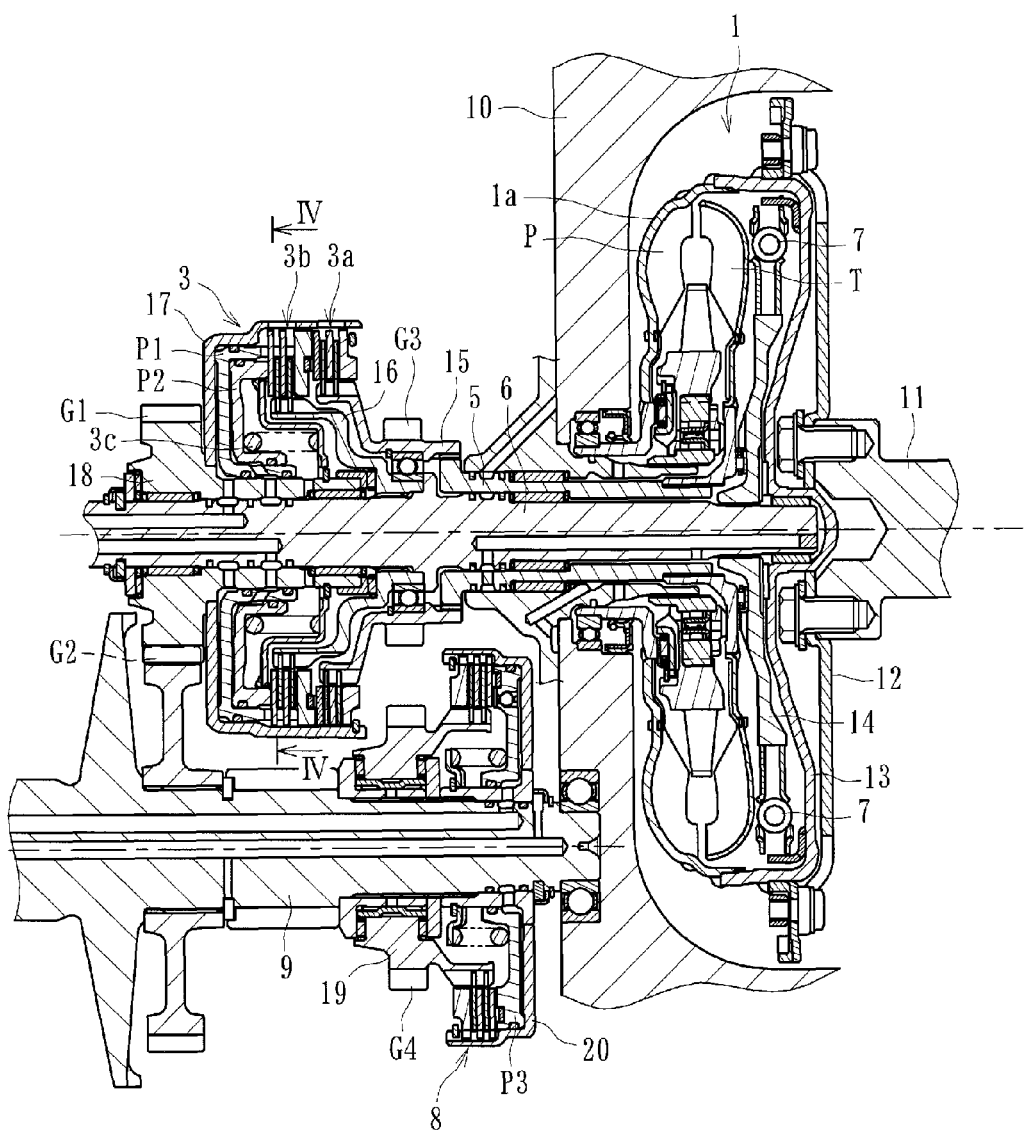

[Fig 2]
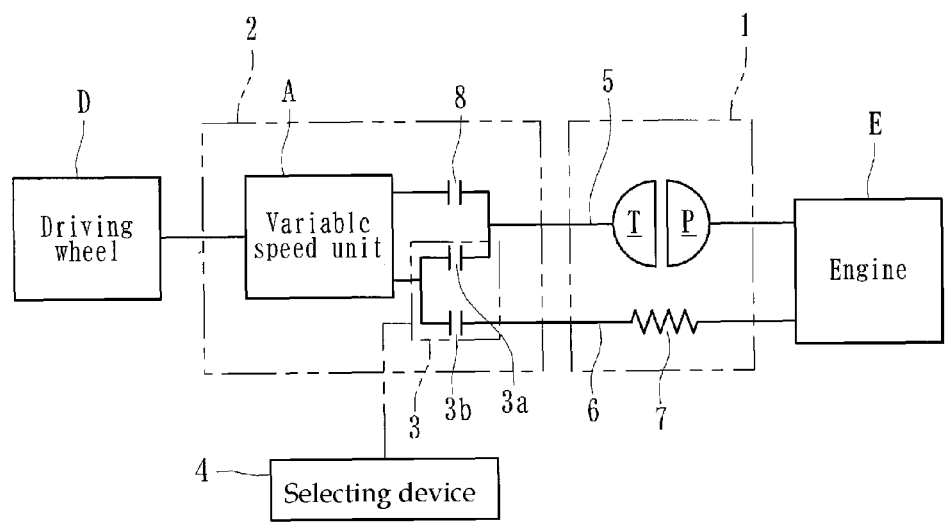
[Fig 3]
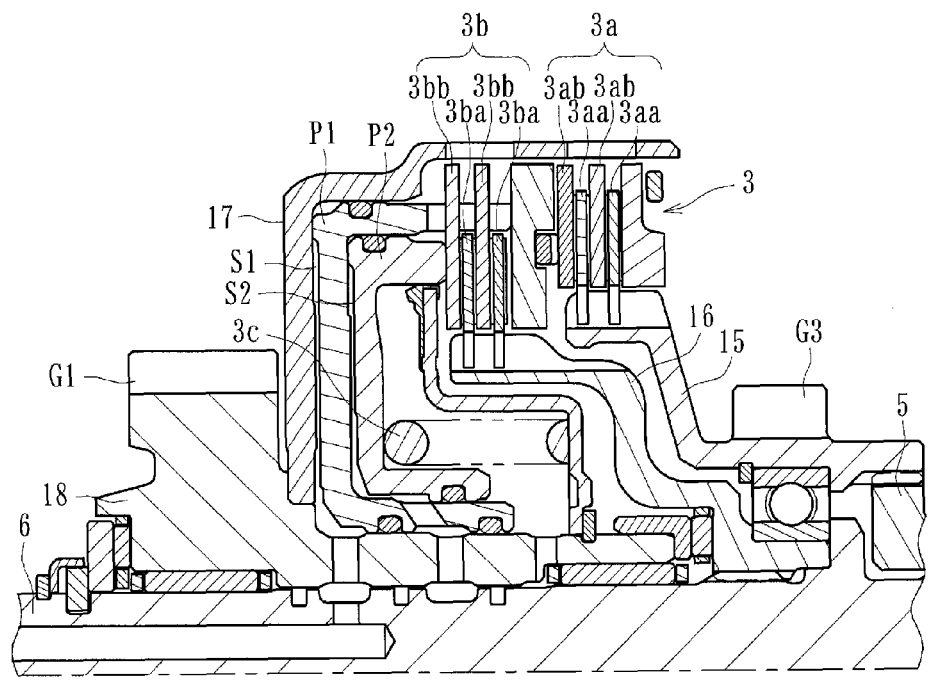

[Fig 4]
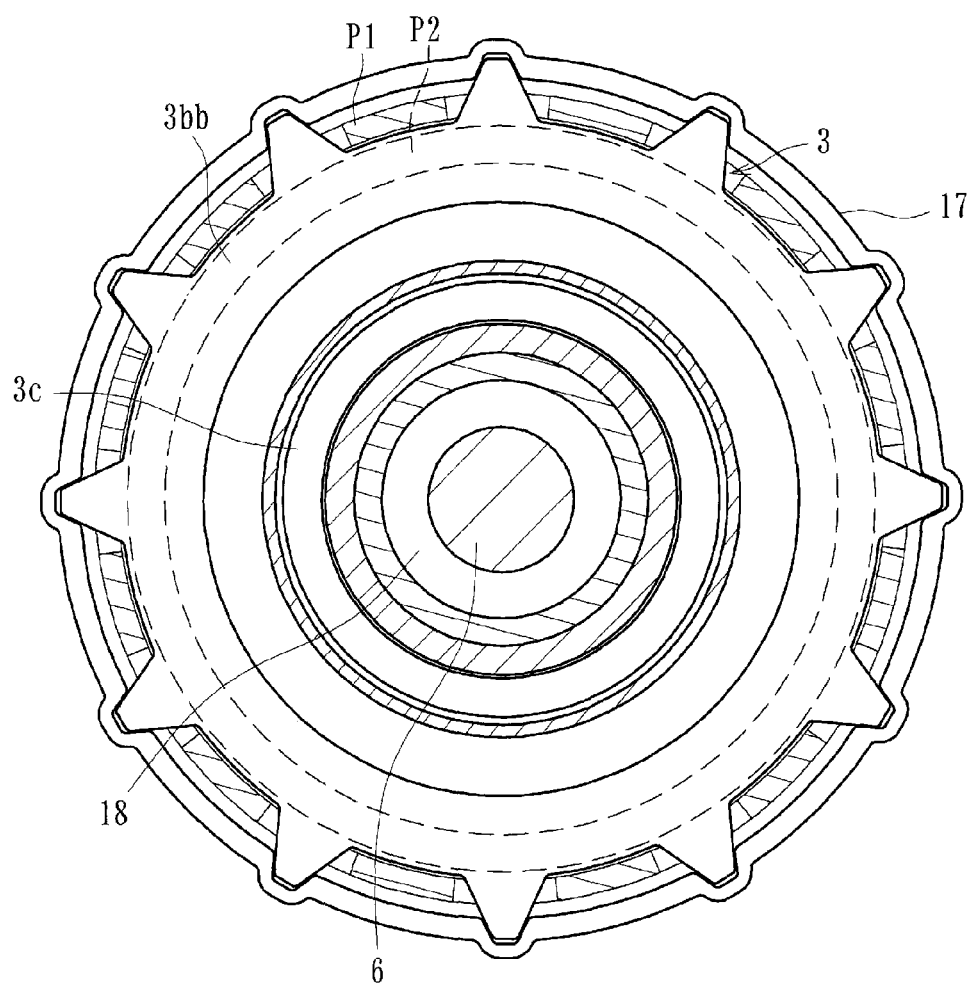

[ Fig 5 ]
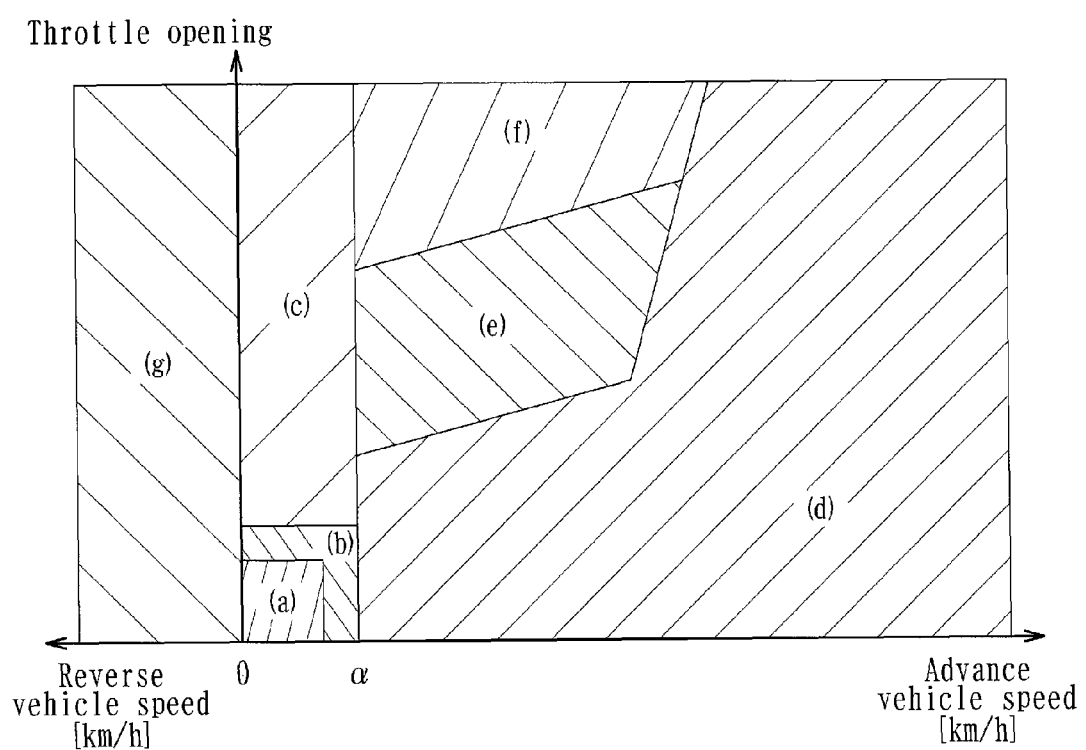

[Fig 6]
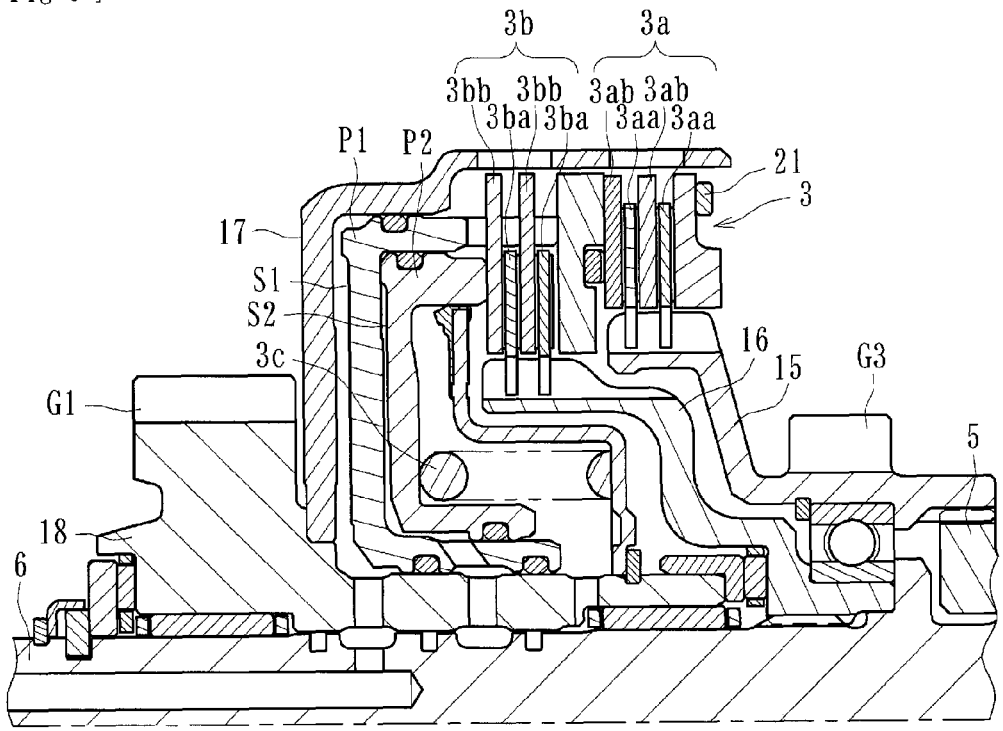
[Fig 7]
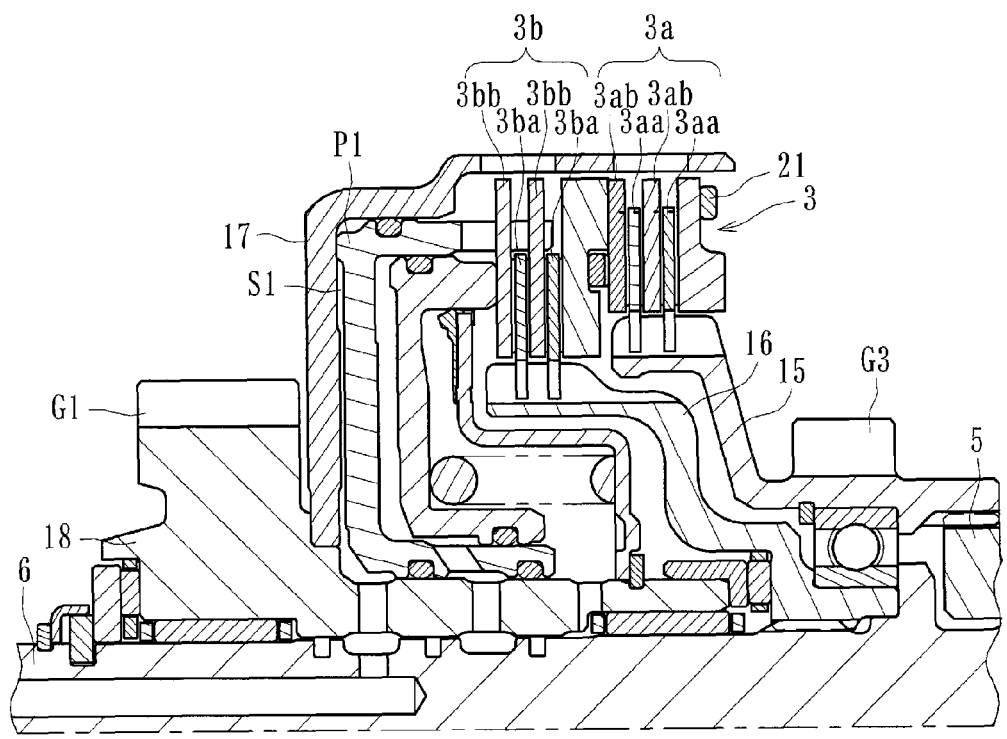

[Fig 8]
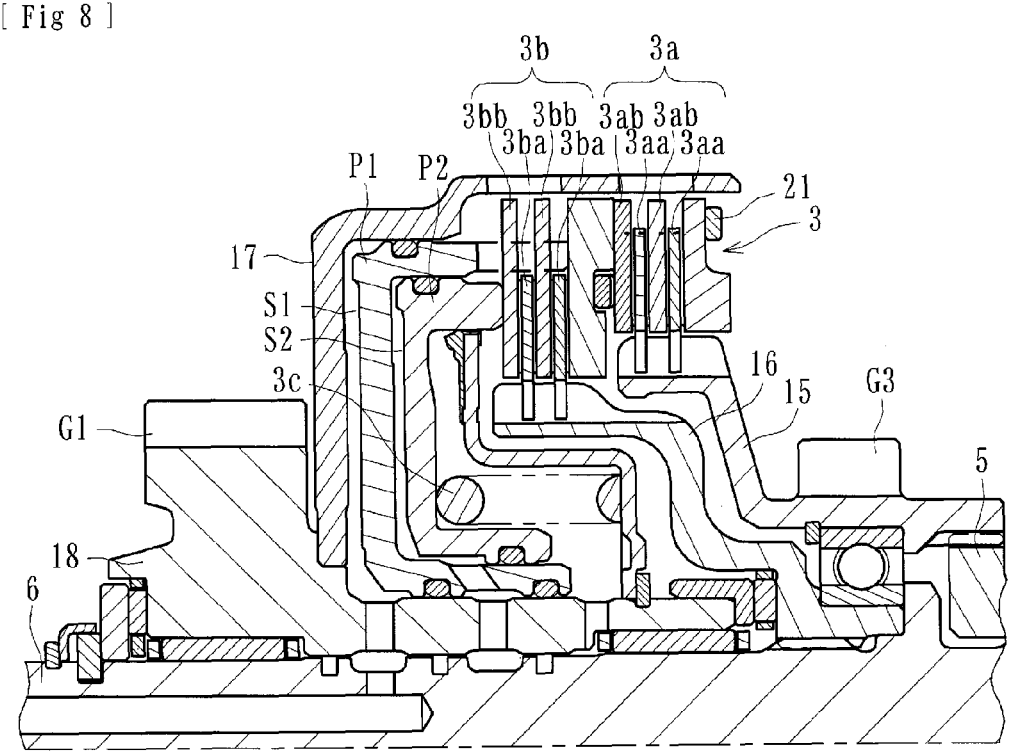
[Fig 9]
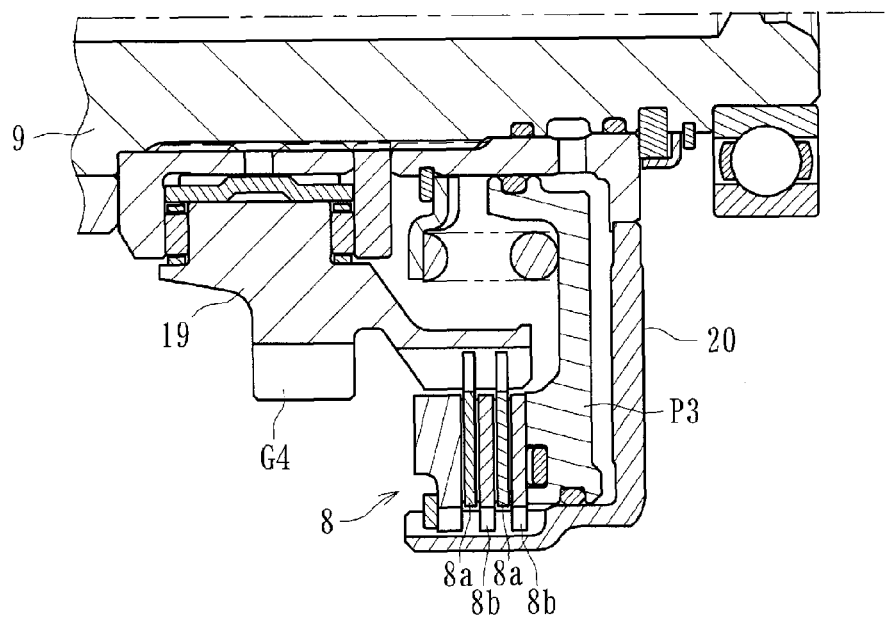

[Fig 10]
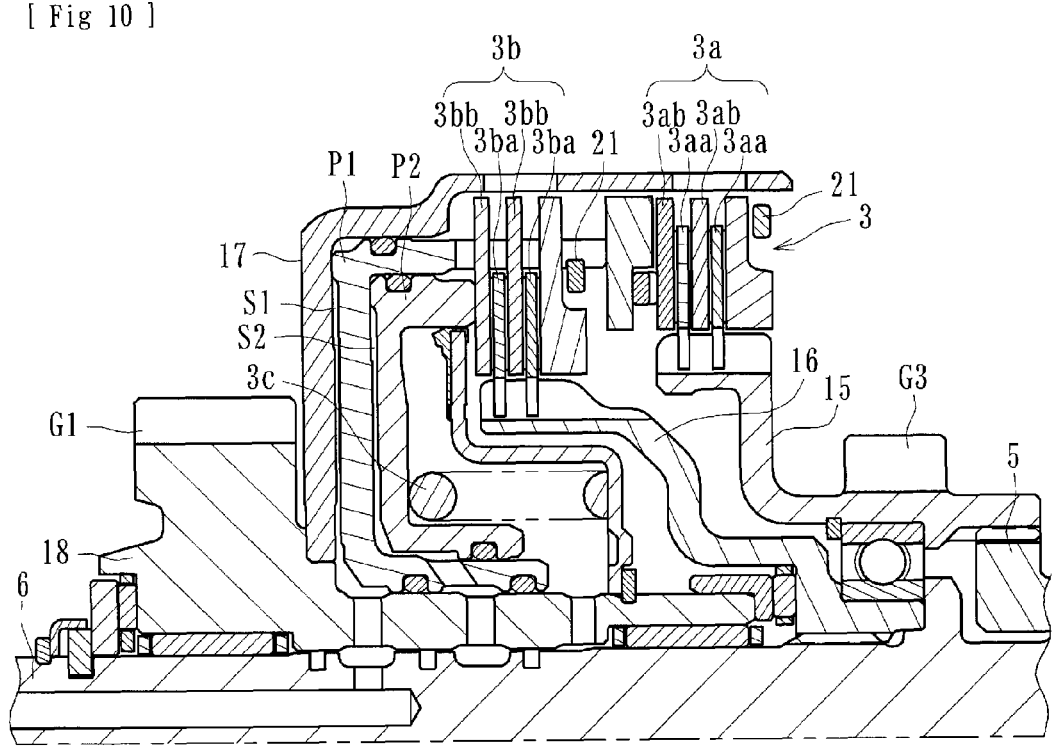
[Fig 11]
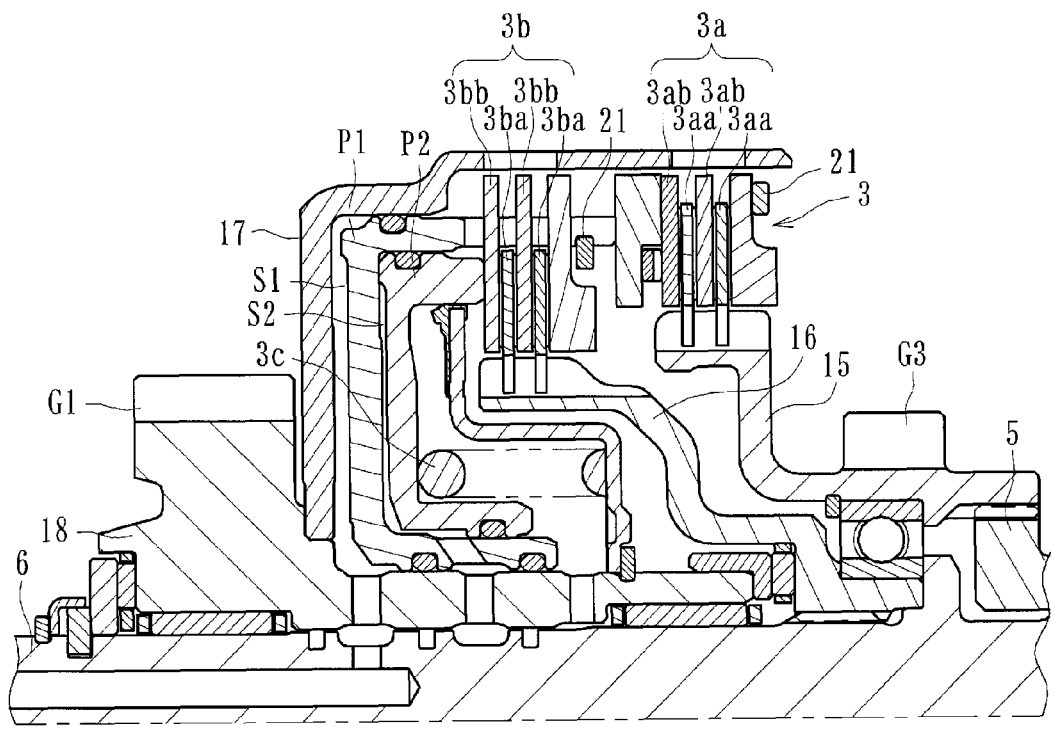

[Fig 12]
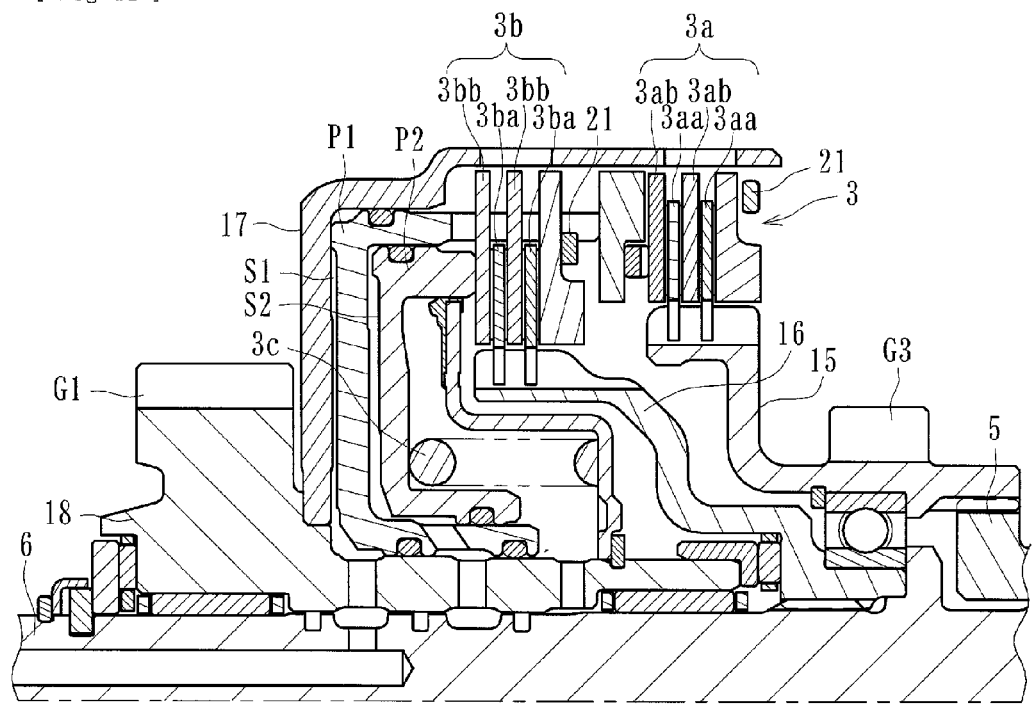
[Fig 13]
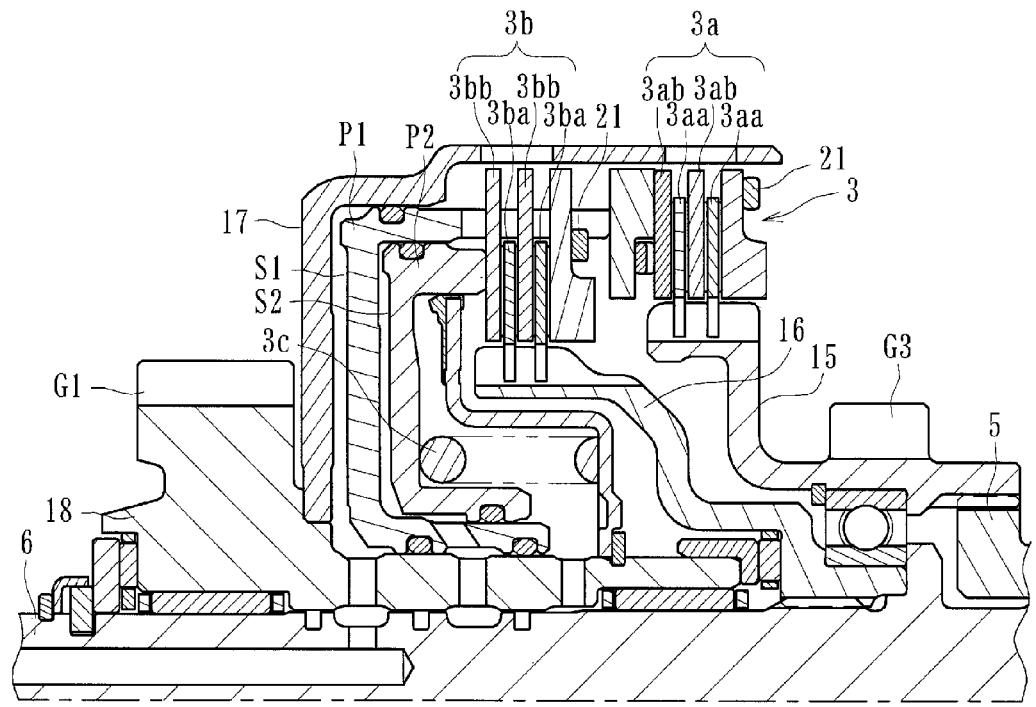

[Fig 14]
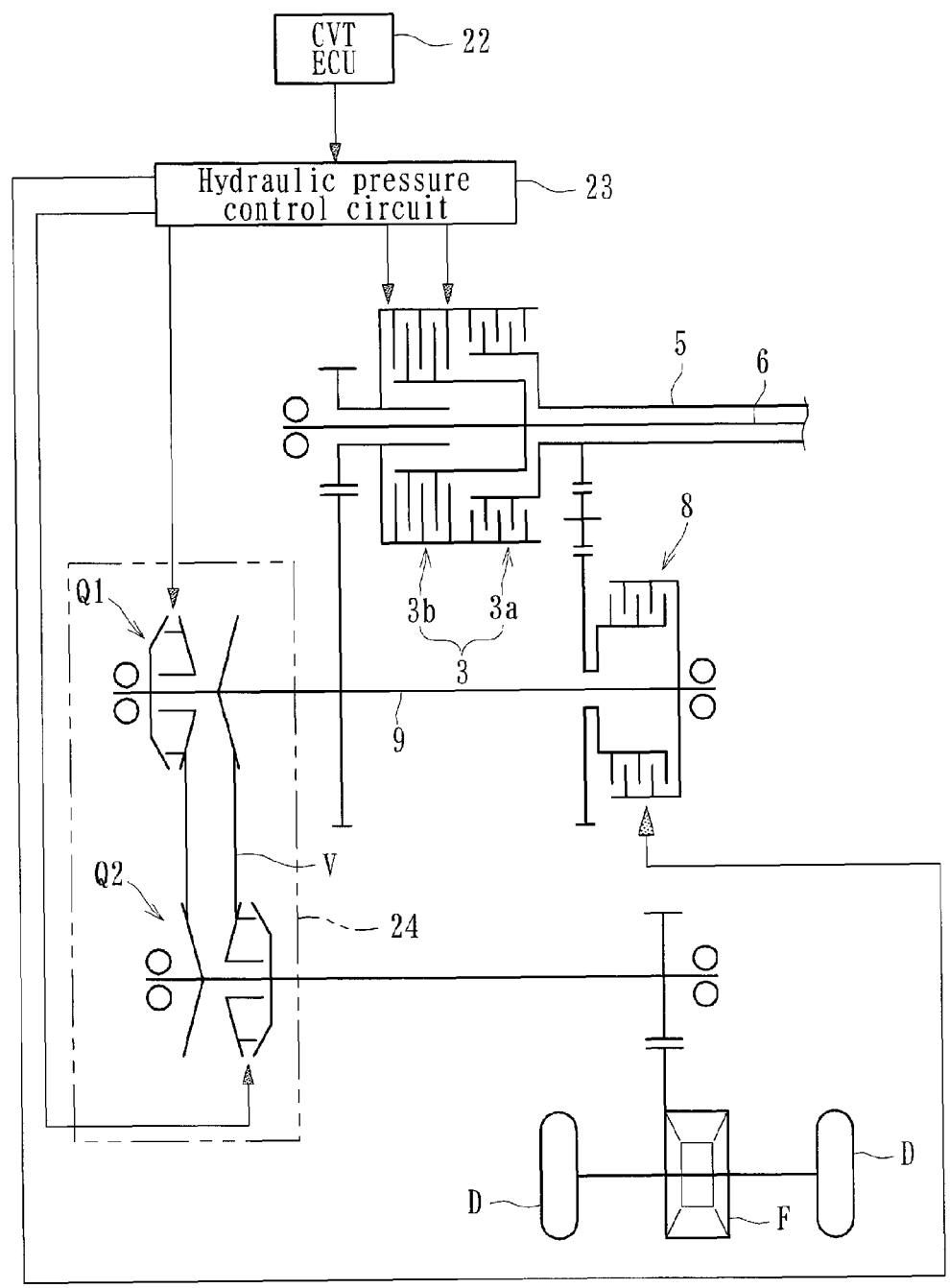

[Fig 15]
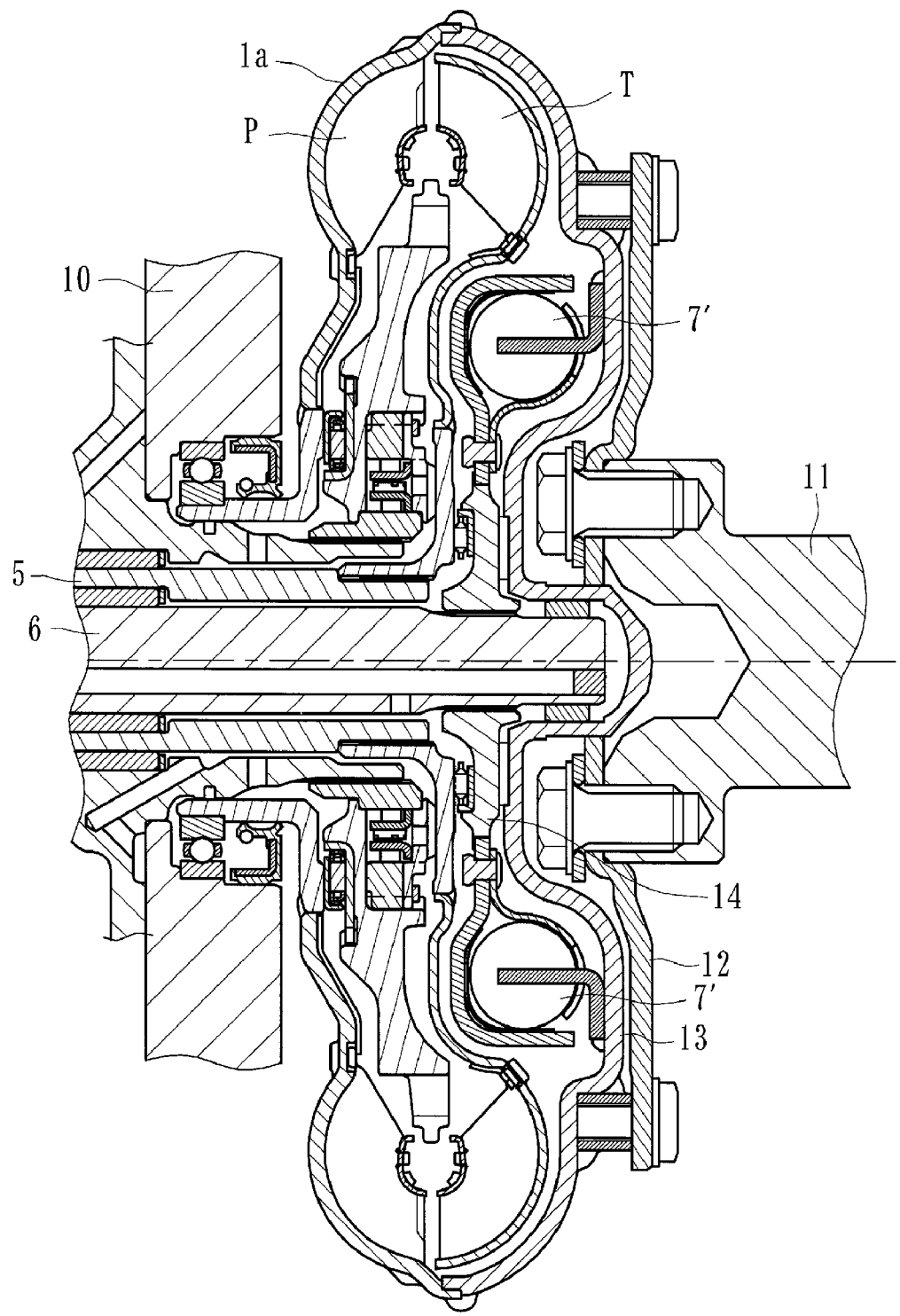

POWER TRANSMITTING APPARATUS

CROSS-REFERENCE TO RELATED APPLICATIONS

This application is a continuation of PCT Application No. PCT/JP2009/003208 filed Jul. 9, 2009, which claims priority to Japanese Application No. 2008-253076, filed Sep. 30, 2008, the entire contents of each of which are hereby incorporated by reference.

BACKGROUND OF THE INVENTIONS

1. Field of the Inventions

The present inventions relate to power transmitting apparatuses for transmitting power from a driving source of a vehicle to its wheels and which are configured to selectively transmit or cut-off the driving force, to or from the wheels.

2. Description of the Related Art

Two types of known power transmitting apparatuses for vehicles (e.g., "automatic transmissions") provide starting power (power for initiating movement of the vehicle from a stop) in different ways. One type uses a torque converter ("tor-con type") and another type uses a starting clutch ("starting clutch type") to provide starting power used to start the movement of the vehicle from a stop. In the torque converter type devices, the starting performance benefits from the torque amplifying function of the torque converter. On the other hand, the starting clutch type benefits from increased efficiency because this type of system does not continuously lose power through slippage which occurs in the torque converter types e.g. during a steady running of vehicle.

Japanese Laid-open Patent Publication No. 3193/2005 discloses a power transmitting apparatus which is a torque converter type automatic transmission combined with a lock-up clutch. In this transmission, the lock-up clutch has a clutch piston connected to a turbine of a torque converter and is movable between a connected position in which it abuts against the inner circumferential surface of a torque converter cover and a non-connected separate position. Thus, the torque converter cover and the turbine can be directly connected and disconnected via the clutch piston.

SUMMARY OF THE INVENTIONS

An aspect of at least one of the inventions disclosed herein includes the realization that the benefits of the torque converter type and lock-up clutch type transmissions can be combined in ways in which reduce the complexity and size of the above noted known combined-type apparatuses, while providing the benefits of the torque amplifying function of the torque converter types systems as well as the power transmitting efficiency of the clutch type systems.

More specifically, during steady operation of a vehicle having a torque converter type system, although it has a technical merit of improving the starting performance because of the torque amplifying function of the torque converter when movement is initially started, it can suffer from loss of some power transmitting efficiency because of slippage generated in the torque converter e.g. during steady run of a vehicle.

On the other hand, in the clutch type system, although it has a technical merit of improving the power transmitting efficiency because of not having any slippage which would be found in the torque converter e.g. during steady run of vehicle, it has a technical demerit of decreasing the starting performance since it does not have the torque amplifying function on start of a vehicle obtained by the torque converter. In order to prevent the decrease of the starting performance, the reduction ratio of such transmissions is usually increased.

Further, the known system described in Japanese Laid-open Patent Publication No. 3193/2005, which is a combined torque converter and clutch type, is a relatively large and complicated structure in which the lock-up clutch is movable between the connected position and the non-connected position in the hydraulic atmosphere within the torque converter. This increases both the manufacturing cost and the maintenance cost.

Thus, in accordance with an embodiment, a power transmitting apparatus can be configured to selectively transmit power from a driving source of a vehicle to wheels of the vehicle. The apparatus can include a hydraulic torque converter, a first clutch device configured to transmit the driving force of the driving source, from the torque converter, to the wheels so as to move the vehicle, and a second clutch device configured to transmit the driving force of the driving source to the wheels without the power being converted by the torque converter so as to move the vehicle. A selecting device can be configured to selectively operate the first and second clutch devices so as to transmit the driving force to the wheels in accordance with a plurality of different modes of operation of the vehicle, at least one of the modes being a starting mode. A power transmitting system configured to transmit power from the driving source of the vehicle to the wheels can comprise the torque converter, the clutch mechanism, and a variable speed unit. The selecting device can be configured to actuate both the first clutch device and the second clutch device in accordance with the condition of the vehicle, and the driving force is thereby transmitted to the wheels through the power transmitting system of the torque converter and without the power transmitting system of the torque converter at a predetermined ratio.

In some embodiments, a first driving shaft can be connected to the first clutch device and can be adapted to be rotated by the driving force of the driving source through the power transmitting system of the torque converter; and a second driving shaft can be connected to the second clutch device and can be adapted to be rotated by the driving force of the driving source without the power transmitting system of the torque converter, wherein the first driving shaft and the second driving shaft are arranged coaxially with each other. Where the first driving shaft and the second driving shaft are arranged coaxially with each other, it is possible to reduce the whole size of the power transmitting apparatus as compared with that where they are separately extended In some embodiments, the second driving shaft can be connected to the driving source through a damper mechanism for damping torque variation. Where the second driving shaft is connected to the driving source through a damper mechanism for damping torque variation, it is possible to damp vibration of the driving source transmitted to the second clutch device.

In some embodiments, the damper mechanism is arranged within the torque converter, and the damper mechanism and a turbine which form part of the torque converter are arranged axially overlapped with each other. Where the damper mechanism is arranged within the torque converter, and where the damper mechanism and a turbine which form part of the torque converter are arranged as being axially overlapped each other, it is possible to reduce the axial size of the torque converter.

In some embodiments, the selecting device can be configured to actuate both the first clutch device and the second clutch device in accordance with the condition of the vehicle, and that the driving force transmitted through the power transmitting system of the torque converter and that transmitted without the power transmitting system of the torque converter are transmitted to the wheels at a predetermined ratio. Where the selecting device is configured to actuate both the first clutch device and the second clutch device in accordance with the condition of the vehicle, and the driving force transmitted through the power transmitting system of the torque converter and that transmitted without the power transmitting system of the torque converter are transmitted to the wheels at a predetermined ratio, it is possible to easily carry out the adjustment of the power transmitted to wheels In some embodiments, the first clutch device and the second clutch device are not actuated, and thus remain in a neutral condition when the vehicle is in the stopped condition, for example, when the brakes of the vehicle are actuated. As such, it is possible to reduce the load on the engine that would be generated by the torque converter and thus improve the fuel consumption.

In some embodiments, the clutch mechanism comprises the first clutch device, the second clutch device and two hydraulic pistons corresponding respectively to the first and second clutch devices contained in a same box member, and the first and second clutch devices can be selectively actuated by controlling the hydraulic pressure for actuating the hydraulic pistons. Such a configuration can further simplify and reduce the structure and the whole size of the power transmitting apparatus.

In some embodiments, the power transmitting apparatus can comprise a third clutch device for transmitting the driving force of the driving source to the wheels through the power transmitting system of the torque converter, and the selecting device can actuate the third clutch device for reverse direction operation of the vehicle. As such, it is possible to reduce the size of the power transmitting apparatus by using only the power transmitting system through the power transmitting system of the torque converter on reverse movement.

In some embodiments, a continuously variable speed unit is interposed between the second clutch device and the wheels in the power transmitting system from the driving source of the vehicle to the wheels. As such, it is possible to use both the clutches, namely, the clutch for advancing the vehicle and the clutch for transmitting the driving force to wheels without the power transmitting system of the torque converter.

BRIEF DESCRIPTION OF THE DRAWINGS

FIG. 1 is a longitudinal cross-sectional view showing a power transmitting apparatus according to an embodiment;

FIG. 2 is a schematic diagram showing the power transmitting apparatus of FIG. 1;

FIG. 3 is an enlarged view showing a clutch of the power transmitting apparatus of FIG. 1;

FIG. 4 is a cross-sectional view taken along a line IV-IV of FIG. 1;

FIG. 5 is a diagram illustrating characteristics of a function of a selecting device of the power transmitting apparatus of FIG. 1;

FIG. 6 is an enlarged sectional view of the clutch mechanism of the power transmitting apparatus of FIG. 1 showing a condition in which only a first clutch device is activated;

FIG. 7 is an enlarged view of the clutch device of the power transmitting apparatus of FIG. 1 showing a condition in which only a second clutch device is activated;

FIG. 8 an enlarged view of the clutch mechanism of the power transmitting apparatus of FIG. 1 showing a condition in which both the first and second clutch devices are activated;

FIG. 9 is an enlarged view showing a condition in which a third clutch device is activated;

FIG. 10 is an enlarged view showing a clutch mechanism according to another embodiment of the power transmitting apparatus;

FIG. 11 is an enlarged view of the clutch mechanism of the power transmitting apparatus of FIG. 10 showing a condition in which only a first clutch device is activated;

FIG. 12 is an enlarged view of the clutch mechanism of the power transmitting apparatus of FIG. 10 showing a condition in which only a second clutch device is activated;

FIG. 13 is an enlarged view of the clutch mechanism of the power transmitting apparatus of FIG. 10 showing a condition in which both the first and second clutch devices are activated;

FIG. 14 is a schematic view showing a power transmitting apparatus in which a variable speed unit A is formed by a continuously variable speed unit; and FIG. 15 is a longitudinal cross-sectional view showing a torque converter and a damper mechanism therein of the power transmitting apparatus according to a further embodiment.

DETAILED DESCRIPTION OF THE PREFERRED EMBODIMENTS

An embodiment of a power transmitting apparatus can be configured to transmit or cut-off the driving force from an engine (driving source) of an automobile (vehicle) to or from the wheels (driving wheels). Such an apparatus can include, with reference to FIGS. 1 and 2, a torque converter 1, a clutch mechanism 3, a selecting device 4, a first driving shaft 5, a second driving shaft 6, a damper mechanism 7, and a third clutch device 8. FIG. 1 is a longitudinal cross-sectional view showing a part of the power transmitting apparatus, and FIG. 2 is a schematic diagram showing the power transmitting apparatus of FIG. 1.

As shown in FIG. 2, the torque converter 1 and a transmission 2 can be arranged as a power transmitting system for transmitting power from the engine E as the driving source of a vehicle to wheels of the vehicle (driving wheels D). Here, the transmission 2 includes the clutch mechanism 3 (which can be referred to as a clutch means), a third clutch device 8 (which can be referred to as a third clutch means) and a variable speed unit A. In FIG. 1, a reference numeral 11 denotes an input shaft extending from the engine E and a reference numeral 9 denotes an output shaft extending to the variable speed unit A.

The torque converter 1 can provide a torque amplifying function for amplifying the torque from the engine E and transmitting it to the transmission 2 and is rotated around its shaft by the driving force transmitted from the engine E. The torque amplifying function of hydraulic torque converters is well known in the art and is associated with the slippage occurring in such torque converters when at or near the stall phase of operation and thus is not further described herein. The torque converter 1 can comprise torque converter covers 1a and 13 for containing a liquid (operating oil) in a fluid-tight manner. A pump P can be formed on the side of torque converter cover 1a and can thus rotate together with the torque converter cover 1a. A turbine T can be arranged oppositely to the pump P and rotatable at a side of the torque converter cover 13.

The input shaft 11 can be connected to the torque converter cover 13 through a cover member 12. When the input shaft 11 is rotated by the driving force of the engine E, the cover member 12, the torque converter covers 13 and 1a, and the pump P are rotated. The rotational torque is thus transmitted to the turbine T through the liquid (operating oil) with the torque being amplified. The turbine T is then rotated by the amplified torque and thus the amplified torque is transmitted to the transmission 2 through a first driving shaft 5 spline-fitted with the turbine T. The term "power transmitting system of the torque converter" used herein means a power transmitting system formed by the torque converter cover 1a, the pump P and turbine T. A reference numeral 10 in FIG. 1 denotes a transmission case.

On the other hand, the torque converter cover 13 is connected to a connecting member 14 through the damper mechanism 7 comprising coil springs and the connecting member 14 is further spline-fitted with the outer circumferential surface of a second driving shaft 6. Accordingly, when the input shaft 11 is rotated by the driving force of the engine E, the cover member 12, the torque converter cover 13, the connecting member 14 and the second driving shaft 6 are rotated, and thus the driving torque of the engine E is transmitted to the transmission 2. That is, the second driving shaft 6 can transmit the driving force to the transmission 2 without the power transmitting system of the torque converter 1.

As described above, the first driving shaft 5 can be rotated by the driving force of the engine E through the power transmitting system of the torque converter 1 and is connected to the first clutch device 3a, and the second driving shaft 6 can be directly rotated by the driving force of the engine E without the power transmitting system of the converter 1 and is connected to the second clutch device 3b. In addition, the first driving shaft 5 can be a hollow cylindrical member and the second driving shaft 6 can be rotatably, coaxially arranged within the first driving shaft 5. Thus, the first driving shaft 5 can be rotatable around the second driving shaft 6 and, on the other hand, the second driving shaft 6 is rotatable within the first driving shaft 5. The first driving shaft 5 and the second driving shaft 6 can be independently rotated by properly selected operation of the clutch device 3.

The clutch mechanism 3 can comprises the first clutch device 3a operable on advancement of an automobile (vehicle) and adapted to transmit the driving force of the engine (driving source) E to the wheels (driving wheels D) through a power transmitting system of the torque converter 1. A second clutch device 3b can be adapted to transmit the driving force of the engine E to the wheels D without the power transmitting system of the torque converter 1. The first and second clutch devices 3a and 3b respectively can comprise a plurality of driving side clutch discs 3aa and 3ba, and a plurality of driven side clutch discs 3ba and 3bb slidable to right and left directions in drawings, and thus each form multiple disc clutches.

In the first clutch device 3a, the driving side clutch discs 3aa can be mounted on an interlocking member 15 connected to the first driving shaft 5 and interlocking therewith and the driven side clutch discs 3ab are mounted on a box member 17, and the driving side clutch discs 3aa and the driven side clutch discs 3ab are alternately arranged each other to form a laminated structure. These driving side clutch discs 3aa and the driven side clutch discs 3ab can be press-contacted or separated with each other. FIG. 6 shows a condition in which the first clutch device 3a is actuated and the driving side clutch discs 3aa and the driven side clutch discs 3ab are press-contacted.

Meanwhile, in the second clutch device 3b, the driving side clutch discs 3ba are mounted on an interlocking member 16 connected to the second driving shaft 6 and interlocking therewith and the driven side clutch discs 3bb are mounted on the boxy member 17, and the driving side clutch discs 3ba and the driven side clutch discs 3bb are alternately arranged each other to form a laminated structure. These driving side clutch discs 3ba and the driven side clutch discs 3bb can be press-contacted or separated with each other. FIG. 7 shows a condition in which the second clutch device 3b is actuated and the driving side clutch discs 3ba and the driven side clutch discs 3bb are press-contacted each other.

The term "separated" used herein means a condition in which a pressure applied to the clutch discs is released while the clutch discs may remain in contact with each other, for example, while slipping. Thus, the term "separated" is not limited only to a physically separated condition. The transmission of driving force is allowed under the press-contacted condition and cut off under the separated condition.

As shown in FIG. 3, the clutch mechanism 3 can comprise the first clutch device 3a, the second clutch device 3b and two hydraulic pistons P1 and P2 corresponding respectively to the first and second clutch devices 3a and 3b contained in a same box member 17. The first and second clutch device 3a and 3b can thus be selectively actuated by controlling the hydraulic pressure for actuating the hydraulic pistons P1 and P2.

For example, the hydraulic piston P1 can be moved toward the right in FIG. 3 against an urging force of a return spring 3c by supplying the operating oil into a hydraulic chamber S1 between the box member 17 and the hydraulic piston P1, and thus the first clutch device 3a is pressed by tips formed on the hydraulic piston P1 to press-contact the driving side clutch discs 3aa and the driven side clutch discs 3ab against each other. The tips formed on the hydraulic piston P1 can be passed through recesses formed on the peripheries of the driving side clutch discs 3ba and the driven side clutch discs 3bb of the second clutch means 2b as shown in FIG. 4.

The hydraulic piston P2 can be moved toward the right in FIG. 3 against an urging force of a return spring 3c by supplying the operating oil into a hydraulic chamber S2 between the hydraulic piston P1 and the hydraulic piston P2, and thus the second clutch device 3b is pressed by tips formed on the hydraulic piston P2 to press-contact the driving side clutch discs 3ba and the driven side clutch discs 3bb against each other. Thus the first clutch device 3a and the second clutch device 3b can be selectively actuated, independently, by controlling the hydraulic pressures operating the hydraulic pistons P1 and P2.

The box member 17 forming part of the clutch mechanism 3 can be connected to an interlocking member 18 formed thereon a gear G1 mating with a gear G2 formed on the output shaft 9. Thus, the driving force of the engine E transmitted through the first and second clutch devices 3a and 3b can be transmitted to the output shaft 9 through the box member 17 and the interlocking member 18.

The selecting device 4 can be configured to selectively actuate the first clutch device 3a or the second clutch device 3b by properly selecting the operation of the hydraulic pistons P1 or P2 with supplying operating oil at a predetermined pressure into the hydraulic chamber S1 or S2 according to conditions (e.g. running speed of a vehicle, inclined angle of a vehicle body etc.) of a vehicle on its advance (including "starting" which means to initiate movement of the vehicle from a stop) in order to transmit the driving force of the engine E to the driving wheels D through or without the power transmitting system of the torque converter 1.

The selecting device 4 can be formed in an ECU (not shown) for controlling the engine E and programmed so as to actuate the clutch mechanism 3 based e.g. on conditions, such as those shown in a diagram (indicating a throttle opening on ordinate and a vehicle speed on abscissa) of FIG. 5. However, other conditions can also be used.

According to the diagram of FIG. 5, following modes (a)-(f) are properly selected and thus the first clutch device 3a or second clutch device 3b can be properly selected and actuated in accordance with any one of these modes (a)-(f). The modes (a)-(f) can be described as follows: (a) an idle neutral mode (a mode of neutral condition in which both the first and second clutch means 3a and 3b are not actuated when a vehicle is in a stopped condition by a braking operation); (b) a creep mode (a mode utilizing a creep phenomenon of the torque converter 1 by operating the first clutch device 3a); (c) a stall mode (a mode in which the first clutch device 3a is actuated on start of a vehicle); (d) a direct starting mode (a mode in which the second clutch device 3b is actuated on start of a vehicle); (e) a torque divided starting mode; and (f) a torque converter starting mode (a mode in which the first clutch device 3a is actuated).

The torque divided starting mode (e) can be a mode in which the driving force transmitted through the power transmitting system of the torque converter 1 and the driving force transmitted without the power transmitting system of the torque converter 1 are transmitted to the driving wheels D at a predetermined ratio by operating both the first and second clutch means 3a and 3b. The ratio of driving forces to be transmitted may be arbitrarily set, or in other words, can be set to any desired ratio. FIG. 8 shows a condition in which both the first and second clutch means 3a and 3b are actuated and the driving side and driven side clutch discs 3aa and 3ab as well as the driving side and driven side clutch discs 3ba and 3bb are in press-contacted conditions.

As described above, since the first or second clutch devices 3a or 3b can be selectively actuated in accordance with modes shown in the diagram of FIG. 5 enabling comparison with conditions of a vehicle, it is possible to transmit the driving force of the engine E to the driving wheels D without the power transmitting system of the torque converter 1 under conditions of level ground start, level ground run and downhill run and also possible to transmit the driving force of the engine E to the driving wheels D through the power transmitting system of the torque converter 1 under conditions of uphill start, uphill run and running during traffic congestion.

On the other hand, the third clutch device 8 can comprise a multiple disc clutch and can be configured to transmit the driving force of the engine E to the driving wheels D through the power transmitting system of the torque converter 1 on reverse run. That is, the driving force of the engine E can be transmitted to the third clutch device 8 with a gear G3 formed on the interlocking member 15 being engaged with a gear G4 formed on a interlocking member 19 on a side of the output shaft 9 through an idle gear (not shown) arranged therebetween by operating a shift lever (not shown) to the reverse position.

Similar to the first clutch device 3a and the second clutch device 3b, the third clutch device 8, as shown in FIG. 9, comprises a box member 20 connected to the output shaft 9 and interlocking therewith. The box member 20 contains therein a hydraulic piston P3 and driving side clutch discs 8a and the driven side clutch discs 8b alternately arranged each other to form a lamination. Thus, the driving side and driven side clutch discs 8a and 8b can be press-contacted or separated by actuating the hydraulic piston P3. FIG. 9 shows a condition in which the driving side and driven side clutch discs 8a and 8b are press-contacted each other by actuation of the hydraulic piston P3.

In some embodiments, the power transmitting apparatus is configured so that the selecting device 4 can actuate only the third clutch device 8 when the vehicle is shifted into reverse gear. That is, when the shift lever is positioned in the reverse (R) range, the apparatus is switched to the R mode (g) as shown in Table of FIG. 5, and thus the driving force of the engine E can be transmitted to the driving wheels D through the power transmitting system of the torque converter 1.

Additionally, in some embodiments, since the power transmitting apparatus comprises a selecting device 4 for transmitting the driving force of the engine E to the driving wheels D through the power transmitting system of the torque converter 1 or for transmitting the driving force of the engine E to the driving wheels D without through the power transmitting system of the torque converter by properly selecting operation of the first clutch device 3a or the second clutch device 3b in accordance with conditions of the vehicle, it is possible to reduce the complexity and size of the apparatus and to improve the starting performance using the torque amplifying function of a torque converter as well as to improve the power transmitting efficiency during steady run of a vehicle. Accordingly, shocks caused by some known lock-up clutches can be reduced or eliminated.

Furthermore, since the first driving shaft 5 and the second driving shaft 6 can be arranged coaxially each other, it is possible to reduce the whole size of the power transmitting apparatus as compared with apparatuses where they are separately and independently extended, as in certain known systems in the prior art. In addition, since the second driving shaft 6 is connected to the engine E through a damper mechanism 7 for damping torque variation, it is possible to damp vibration of the engine E transmitted to the second clutch device 3b.

With such configurations, although the damper mechanism 7 can have the structure of lock-up mechanism of the prior art, it is also possible to use springs of larger diameter or to change the position of their arrangement. For example, as shown in FIG. 15, it is possible to form a damper mechanism 7' in which it is arranged within the torque converter 1, and the damper mechanism and a turbine T forming part of the torque converter 1 are arranged as being axially (i.e. the right-left direction in FIG. 1) overlapped each other. This makes it possible to reduce the axial size of the torque converter 1.

In addition, since the selecting device 4 can be configured to actuate both the first clutch device 3a and the second clutch device 3b in accordance with the condition of the vehicle (e.g. when the torque divided starting mode (e) in diagram of FIG. 5 is selected), and the driving force transmitted through the power transmitting system of the torque converter 1 and that transmitted without the power transmitting system of the torque converter 1 are transmitted to the driving wheels D at a predetermined ratio, it is possible to easily carry out the adjustment of the power to be transmitted to the driving wheels D. In such configurations, it is preferable to change the ratio of the driving force between when the torque amplifying function of the torque converter 1 is frequently utilized and when improvement of the power transmitting efficiency is intended with preventing slippage of the torque converter 1.

Accordingly, the first clutch device 3a and the second clutch device 3b can be de-activated and kept in the neutral condition when a vehicle is in the stopped condition due to braking operation (e.g. when the idle neutral mode (a) in diagram of FIG. 5 is selected), it is possible to improve the fuel consumption. In addition, where the power transmitting apparatus comprises a third clutch device 8 for transmitting the driving force of the engine E to the driving wheels D through the power transmitting system of the torque converter 1, and the selecting device 4 can actuate only the third clutch device 8 on reverse of the vehicle, it is possible to suppress increase of the size of the power transmitting apparatus by using only the power transmitting system through the power transmitting system of the torque converter 1 on reverse run of low frequency.

Furthermore, since the clutch mechanism 3 comprises the first and second clutch devices 3a and 3b and the two hydraulic piston P1 and P2 corresponding respectively to the first and second clutch devices 3a and 3b contained within the same box member 17 and the first and second clutch devices 3a and 3b can be independently and selectively actuated by controlling the hydraulic pressure for actuating the hydraulic pistons P1 and P2, it is possible to further reduce complication and the whole size of the power transmitting apparatus.

The variable speed unit A can be a continuously variable speed unit 24 (e.g. CVT: Continuously Variable Transmission) as shown in FIG. 14. In this case, the continuously variable speed unit 24 can be arranged between the second clutch device 3b of the clutch mechanism 3 and the driving wheels D on the way of a power transmitting system from the engine E of a vehicle to the driving wheels D.

Such a continuously variable speed unit 24 comprises two pulleys Q1 and Q2 and a belt V extending therebetween and can achieve a desired speed by independently changing diameters of the pulleys Q1 and Q2 on which the belt V runs by a hydraulic pressure control circuit 23. The continuously variable speed unit 24 further comprises a CVTECU 22 electrically connected to a brake switch of a brake pedal, a position sensor of a shifting lever, an engine ECU (not shown) etc. and the hydraulic control circuit 23 is further controlled by the CVTECU 22. The previously described hydraulic pistons P1-P3, are also selectively controlled by the hydraulic pressure control circuit 23.

Since a continuously variable speed unit 24 is interposed between the second clutch device 3b of the clutch mechanism 3 and the driving wheels D on the way of the power transmitting system from the engine E of the vehicle to the driving wheels D, it is possible to use both the clutch for advancing a vehicle and the clutch for transmitting the driving force to the driving wheels D without the power transmitting system of the torque converter 1 in the second clutch device 3b. A reference character F denotes a differential gear of a vehicle.

The present inventions are described above in the context of certain specific embodiments. However the present inventions are not limited to those embodiments described and shown herein. For example, but without limitation, embodiments of the power transmitting apparatus can be constructed so that the selecting device 4 can set each mode of (a)-(f) corresponding to the inclined angle of a vehicle in addition to those shown in FIG. 5. In addition, although it is shown as an embodiment that the first and second driving shafts 5 and 6 are coaxially arranged each other, they may be separately arranged in a parallel relation with each other.

Furthermore, although it has been described as an embodiment that the driving force of the engine E is transmitted to the driving wheels D through the power transmitting system of the torque converter 1 by actuating only the third clutch device 8 on reverse of a vehicle, it is possible to construct the power transmitting apparatus so that a fourth clutch device (not shown) for transmitting the driving force of the engine E to the driving wheels D without the power transmitting system of the torque converter 1 is added to the apparatus and either one of the third clutch device 8 or the fourth clutch device may be properly selected in accordance with a reverse drive condition of a vehicle.

In addition, although it is possible in the illustrated embodiments that the second clutch device 3b can transmit the driving force in addition to the first clutch device 3a when the hydraulic piston P1 is actuated, the power transmitting apparatus can be constructed so that an additional stopper 21 is also arranged on the side of second clutch device 3b as shown in FIG. 10 and the second and first clutch devices 3b and 3a can be actuated independently each other. In such a case, a condition in which only the first clutch device 3a is actuated is shown in FIG. 11, a condition in which only the second clutch device 3b is actuated is shown in FIG. 12, and a condition in which both the first and second clutch devices 3a and 3b are actuated is shown in FIG. 13.

In the illustrated embodiment, although it is shown that the driving source is the engine E, the present inventions are not limited to this configuration. For example, but without limitation, other driving sources e.g. an electric motor used in an electric car and a hybrid car can be used as well. Furthermore, although it is shown in the illustrated embodiments that the selecting device 4 is formed in the ECU, it may be formed in a separately arranged microcomputer.

The present inventions can also be applied to any power transmitting apparatus having different configurations in its external appearance or structural parts or those having additional functions if the power transmitting apparatus is provided with a selecting device for transmitting the driving force of the driving source to the wheels through the power transmitting system of the torque converter or for transmitting the driving force of the driving source to the wheels without the power transmitting system of the torque converter by properly selecting operation of the first clutch device or the second clutch device in accordance with conditions of the vehicle on its advancement mode, including starting.

What is claimed is:

1. A power transmitting apparatus for selectively transmitting power from a driving source of a vehicle to wheels of the vehicle, comprising:
    a torque converter having a torque amplifying function;
    a clutch mechanism including a first clutch device configured to transmit the driving force of the driving source to the wheels through a power transmitting system of the torque converter so as to move the vehicle, and a second clutch device configured to transmit the driving force of the driving source to the wheels without the power transmitting system of the torque converter so as to move the vehicle; and
    a selecting device configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance a plurality of different modes of operation of the vehicle, at least one of the modes being a starting mode;
    wherein a power transmitting system configured to transmit power from the driving source of the vehicle to the wheels comprises the torque converter and a transmission and wherein the clutch mechanism and a variable speed unit are arranged within the transmission;
    wherein the selecting device is configured to actuate both the first clutch device and the second clutch device in accordance with the condition of the vehicle, and the driving force is thereby transmitted to the wheels through the power transmitting system of the torque converter and without the power transmitting system of the torque converter at an arbitrarily-set ratio, and the first clutch device is arranged downstream of the torque converter in the power transmitting system.

2. A power transmitting apparatus of claim 1 further comprising:
- a first driving shaft connected to the first clutch device and configured to be rotated by the driving force of the driving source through the power transmitting system of the torque converter; and
- a second driving shaft connected to the second clutch device and configured to be rotated by the driving force of the driving source without the power transmitting system of the torque converter;
- wherein the first driving shaft and the second driving shaft are arranged coaxially with each other.

3. A power transmitting apparatus of claim 2, wherein the second driving shaft is connected to the driving source through a damper mechanism configured to dampen torque variation.

4. A power transmitting apparatus of claim 3, wherein the damper mechanism is arranged within the torque converter, and wherein the damper mechanism and a turbine form part of the torque converter and are arranged as being axially overlapped with each other.

5. A power transmitting apparatus of claim 1 wherein the first clutch device and the second clutch device are configured such that when the first clutch device and the second clutch device are not actuated and remain in a neutral condition, the vehicle can be in a stopped condition by braking operation of the vehicle.

6. A power transmitting apparatus of claim 1 wherein the clutch mechanism comprises the first clutch device, the second clutch device, and two hydraulic pistons corresponding respectively to the first and second clutch device contained in a same box member, and wherein the first and second clutch devices are configured to be selectively actuated by changes in the hydraulic pressure actuating the hydraulic pistons.

7. A power transmitting apparatus of claim 1 further comprising a third clutch device configured to transmit the driving force of the driving source to the wheels through the power transmitting system of the torque converter, and wherein the selecting device is configured to actuate the third clutch device during a reverse direction operation of the vehicle.

8. A power transmitting apparatus of claim 1 wherein the variable speed unit is a continuously variable speed unit.

9. A power transmitting apparatus for selectively transmitting power from a driving source of a vehicle to wheels of the vehicle, comprising:
- a hydraulic torque converter;
- a first clutch device configured to transmit the driving force of the driving source, from the torque converter, to the wheels so as to move the vehicle, and a second clutch device configured to transmit the driving force of the driving source to the wheels without the power being converted by the torque converter so as to move the vehicle; and
- a selecting device configured to selectively operate the first and second clutch devices so as to transmit the driving force to the wheels in accordance a plurality of different modes of operation of the vehicle, at least one of the modes being a starting mode;
- wherein a power transmitting system configured to transmit power from the driving source of the vehicle to the wheels comprises the torque converter, the clutch devices, and a variable speed unit;
- wherein the selecting device is configured to actuate both the first clutch device and the second clutch device in accordance with the condition of the vehicle, and the driving force is thereby transmitted to the wheels through the power transmitting system of the torque converter and without the power transmitting system of the torque converter at an arbitrarily-set ratio, and the first clutch device is arranged downstream of the torque converter in the power transmitting system.

10. A power transmitting apparatus of claim 9 further comprising:
- a first driving shaft connected to the first clutch device and configured to be rotated by the driving force of the driving source through the power transmitting system of the torque converter; and
- a second driving shaft connected to the second clutch device and configured to be rotated by the driving force of the driving source without the power transmitting system of the torque converter;
- wherein the first driving shaft and the second driving shaft are arranged coaxially with each other.

11. A power transmitting apparatus of claim 10, wherein the second driving shaft is connected to the driving source through a damper mechanism configured to dampen torque variation.

12. A power transmitting apparatus of claim 11, wherein the damper mechanism is arranged within the torque converter, and wherein the damper mechanism and a turbine form part of the torque converter and are arranged as being axially overlapped with each other.

13. A power transmitting apparatus of claim 9 wherein the first clutch device and the second clutch device are configured such that when the first clutch device and the second clutch device are not actuated and remain in a neutral condition, the vehicle can be in a stopped condition by braking operation of the vehicle.

14. A power transmitting apparatus of claim 9, additionally comprising first and second hydraulic pistons corresponding respectively to the first and second clutch devices contained in a box member, and wherein the first and second clutch devices are configured to be selectively actuated by changes in the hydraulic pressure actuating the first and second hydraulic pistons.

15. A power transmitting apparatus of claim 9 additionally comprising a third clutch device configured to transmit the driving force of the driving source to the wheels through the power transmitting system of the torque converter, and wherein the selecting device is configured to actuate the third clutch device during a reverse direction operation of the vehicle.

16. A power transmitting apparatus of claim 9 wherein the variable speed unit is a continuously variable speed unit.

* * * * *